W. L. FISH.
Attachment to Lamp Chimneys.
No. 1,596. Reissued Jan'y 5, 1864.
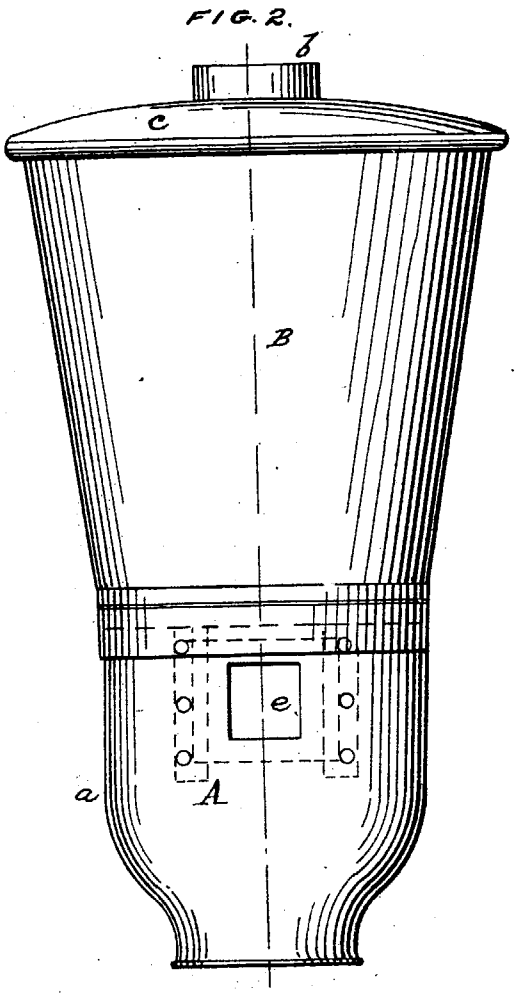
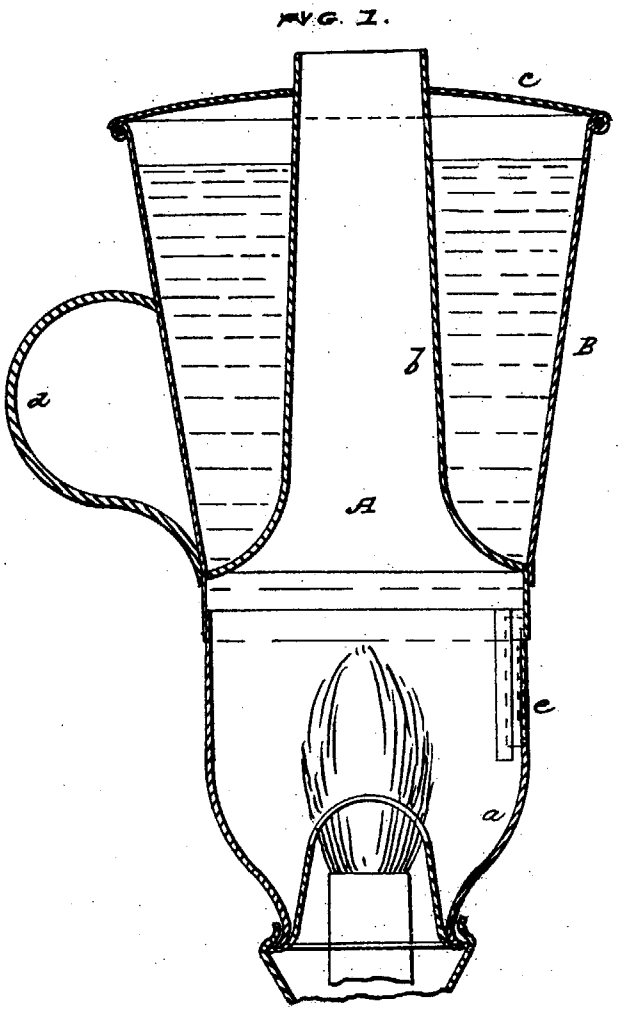
WITNESSES:
James Land
R. L. Gawley
INVENTOR.
Warren L. Fish.
N. PETERS, Photo-Lithographer, Washington, D. C.

UNITED STATES PATENT OFFICE.

WARREN L. FISH, OF NEWARK, NEW JERSEY.

IMPROVEMENT IN LAMP-CHIMNEYS.

Specification forming part of Letters Patent No. 35,598, dated June 17, 1862; Reissue No. 1,368, dated December 23, 1862; Reissue No. 1,596, dated January 5, 1864.

*To all whom it may concern:*

Be it known that I, WARREN L. FISH, of Newark, in the county of Essex and State of New Jersey, have invented new and useful Improvements in Heating-Vessels to be used as an Attachment to Oil-Lamps or Oil-Lamp Chimneys; and I hereby declare the following to be a full, clear, and exact description of the same, reference being had to the accompanying drawings, forming part of this specification, in which—

Figure 1 represents a vertical central section of an apparatus made in accordance with my invention, and Fig. 2 a side elevation of the same.

Lamps were heretofore constructed for heating purposes or illuminating purposes exclusively. The former were made for the use of alcohol or other non-illuminating fluid, or they were constructed to burn their supply, if of an illuminating-power, to generate a heating-flame at the expense of light.

My invention has for its object the utilization of the heat of the illuminating-flame of oil-lamps; and it consists, first, in forming over and around the flame of an ordinary kerosene or other lamp a heating-chamber having no other outlet than the flue or chimney of the lamp, and being, in fact, a chamber in the chimney of the lamp, by which it is adapted for heating or cooking purposes; second, in the use, in connection with oil-lamps of ordinary construction and operation, of heating-vessels containing a central flue so shaped as to form the chimney of the said lamp, substantially as hereinafter to be shown and described, whereby the same lamp may be used both for illuminating and heating purposes, or for either; third, in the use, in oil-lamps of ordinary construction and in connection with a heating-vessel, of a bulb or its equivalent device for the intermediate support of said vessel by or over the lamp, substantially as hereinafter to be described and shown; fourth, in the combination, with a heating-vessel and bulb, when the latter is made of an opaque material, of a window or the equivalent thereof, made of a transparent material for the transmission through it of light.

To enable others to make and use my invention, I shall now proceed to describe, in illustration thereof, the construction, arrangement, and operation of a lamp with an attachment for heating purposes.

The heating-vessel (marked in the accompanying drawings B, and which may be of a cylindrical or any other convenient or suitable form) contains in its interior a flue shaped in accordance with a chimney. This flue is soldered at its base—*i. e.*, at its flare-mouthed extremity—to the under side of the vessel, so as to leave a small rim to project from its under side, whereby to clasp the bulbs. The flue or chimney is located concentrically with and extends upward throughout the whole height and beyond the top of the vessel, so that water or other liquid which may be placed into the vessel, shall thereby be excluded from the burner and lamp. The vessel, to complete it, is provided with a cover, C, through the central orifice of which the chimney or flue of the vessel passes through. The vessel, thus constructed, is attached to the lamp by means of a bulb, *a*, shaped to partake of the form of the lower portion of the ordinary glass chimney, constituting, as it were, the continuation or complement of the chimney in the vessel; also the means of attachment to the lamp. The bulb is applied with its smaller opening downward to the burner, and is there secured to the lamp by means of the usual spring or set-screw setting or clasping in with the rim or flange there formed. The opening on top of the bulb is made snugly to fit the annular flange on under side of the heating-vessel. The bulb I prefer to make of an opaque material, preferably metal, on account of the strength necessary to perform its functions as support of the heating-vessel, and for the purpose of shutting out the light of the lamp when it may be used in lieu of a shade. The light emitted by the flame may be used at the time its heat is being utilized. For this purpose, I provide the bulb with a window, *e*—that is, I form a circular or otherwise-shaped opening in the bulb—and line it, by rivets or otherwise, with mica or other suitable transparent substance. By this arrangement not only can the flame from without be observed, but sufficient light may be admitted into the room to allow of the lamp being used as a nursery-lamp. The bulb being capable of turning in the burner-socket, the light emanating from the window may be thrown away from any spot in the room into any desired direction. If, for instance, it be intended to use the ordinary coal-oil lamp for heating purposes, I remove the glass chimney, and in lieu thereof I fix to the burner the bulb, and onto the bulb the above-described vessel, filled with water or other liquid to be warmed. The liquid will be heated, at will, in more or less time, according to the flame. From the above it will appear that the vessel with its flue may be used without the bulb, and the ordinary chimney, whether of glass or other material, may be used in lieu of the bulb. The mode of fastening would then consist in simply slipping the vessel as a sleeve onto the ordinary chimney; but I prefer the mode hereinbefore shown and described.

Having thus fully described my invention, I shall state my claims as follows:

1. Forming over and around the flame of an ordinary kerosene or other lamp a heating-chamber, having no other outlet than the flue or chimney of the lamp, and being, in fact, a chamber in the chimney of the lamp, by which it is adapted for heating or cooking purposes.

2. The use, in connection with oil-lamps of ordinary construction and operation, of heating-vessels containing a central flue, so shaped as to form the chimney of said lamp, substantially as herein shown and described, whereby the same lamp may be used for both illuminating and heating purposes, or for either.

3. In oil-lamps of ordinary construction and in connection with a heating-vessel, the use of a bulb or its equivalent device for the intermediate support of said vessel by or over the lamp, substantially as herein shown and described.

4. In combination with a heating-vessel and bulb, the use of a window or of windows, or the equivalent thereof, made of a transparent material for the transmission of light through it, substantially as and for the purposes set forth.

In testimony whereof I have signed this specification in presence of two witnesses.

W. L. FISH.

Witnesses:
D. W. BALDWIN,
T. L. DUNHAM.